(12) United States Patent
Kalra (10) Patent No.: US 10,876,937 B2
(45) Date of Patent: Dec. 29, 2020

(54) ASSEMBLY FOR FORMING MICROCHAMBER FOR INVERTED SUBSTRATE

(71) Applicant: BIOGENEX LABORATORIES INC., San Ramon, CA (US)

(72) Inventor: Krishan L. Kalra, Fremont, CA (US)

(73) Assignee: BioGenex Laboratories, Inc., San Ramon, CA (US)

( * ) Notice: Subject to any disclaimer, the term of this patent is extended or adjusted under 35 U.S.C. 154(b) by 31 days.

(21) Appl. No.: 15/026,925

(22) PCT Filed: Oct. 3, 2014

(86) PCT No.: PCT/US2014/059132
§ 371 (c)(1),
(2) Date: Apr. 1, 2016

(87) PCT Pub. No.: WO2015/051295
PCT Pub. Date: Apr. 9, 2015

(65) Prior Publication Data
US 2016/0299043 A1      Oct. 13, 2016

Related U.S. Application Data

(60) Provisional application No. 61/887,066, filed on Oct. 4, 2013.

(51) Int. Cl.
*G01N 1/31* (2006.01)
*G01N 1/30* (2006.01)
(Continued)

(52) U.S. Cl.
CPC .......... *G01N 1/312* (2013.01); *B01L 3/50273* (2013.01); *B01L 3/502715* (2013.01);
(Continued)

(58) Field of Classification Search
CPC .... G01N 1/312; G01N 1/30; B01L 3/502715; B01L 3/502723; B01L 3/50273; B01L 7/52; B01L 9/50; B01L 9/52
(Continued)

(56) References Cited

U.S. PATENT DOCUMENTS 4,041,995 A * 8/1977 Columbus ............. B01L 3/0268
141/275
6,238,910 B1 * 5/2001 Custance ................ B01L 3/502
435/286.1
(Continued)

OTHER PUBLICATIONS

International Search Report and Written Opinion dated Feb. 27, 2015, issued in International Application No. PCT/US2014/059132 filed Oct. 3, 2014, in 18 pages.

*Primary Examiner* — Matthew D Krcha
*Assistant Examiner* — Jacqueline Brazin
(74) *Attorney, Agent, or Firm* — Banner & Witcoff, Ltd.

(57) ABSTRACT

An assembly for forming a microchamber for an inverted substrate is disclosed. The assembly can include a body having a chamber formed therein. A dispensing cavity can be provided to supply a reagent to the chamber. A slide support structure can be configured to support the slide such that the tissue sample faces the chamber when the slide is mounted to the slide support structure. The chamber and the slide support structure can be dimensioned such that, when the reagent is supplied to the dispensing cavity, the reagent is drawn to the chamber by way of capillary forces acting on the reagent.

42 Claims, 10 Drawing Sheets

(51) Int. Cl.
   *B01L 7/00* (2006.01)
   *B01L 3/00* (2006.01)
   *B01L 9/00* (2006.01)

(52) U.S. Cl.
   CPC ........... *B01L 3/502723* (2013.01); *B01L 7/52* (2013.01); *B01L 9/50* (2013.01); *B01L 9/52* (2013.01); *G01N 1/30* (2013.01); *B01L 2200/027* (2013.01); *B01L 2200/028* (2013.01); *B01L 2200/0684* (2013.01); *B01L 2200/142* (2013.01); *B01L 2300/043* (2013.01); *B01L 2300/045* (2013.01); *B01L 2300/06* (2013.01); *B01L 2300/0609* (2013.01); *B01L 2300/0822* (2013.01); *B01L 2300/14* (2013.01); *B01L 2300/16* (2013.01); *B01L 2300/18* (2013.01); *B01L 2300/1805* (2013.01); *B01L 2400/0406* (2013.01)

(58) Field of Classification Search
   USPC ........................................................ 422/501
   See application file for complete search history.

(56) References Cited

U.S. PATENT DOCUMENTS

| | | | |
|---|---|---|---|
| 7,682,565 | B2 | 3/2010 | Linton et al. |
| 7,943,093 | B2 | 5/2011 | Adrien et al. |
| 2005/0238541 | A1* | 10/2005 | Barski ............... B01L 9/52 422/547 |
| 2005/0239195 | A1* | 10/2005 | Oram ............... B01L 3/502 435/288.3 |
| 2005/0270642 | A1* | 12/2005 | McLellan ......... B01L 3/508 359/391 |
| 2010/0209298 | A1* | 8/2010 | Kalra ............... B01L 3/508 422/63 |
| 2011/0165034 | A1* | 7/2011 | Carlson ........... B67D 7/02 422/261 |
| 2012/0201723 | A1* | 8/2012 | Loeffler ............ B01L 3/502 422/501 |

* cited by examiner

ASSEMBLY FOR FORMING MICROCHAMBER FOR INVERTED SUBSTRATE

CROSS-REFERENCE TO RELATED APPLICATIONS

This application is a national phase application of International Application No. PCT/US2014/059132 (published as WO 2015/051295), filed Oct. 3, 2014, entitled "ASSEMBLY FOR FORMING MICROCHAMBER FOR INVERTED SUBSTRATE," which claims priority to U.S. Provisional Patent Application No. 61/887,066, filed Oct. 4, 2013, entitled "INVERTED SUBSTRATE MECHANISM FOR FORMING MICROCHAMBER," the contents of each of which are incorporated by reference herein in their entirety and for all purposes.

BACKGROUND OF THE INVENTION

Field of the Invention

The field relates to microchambers for sample analysis, and, in particular, to an assembly for forming a microchamber for an inverted substrate.

Description of the Related Art

Tissue samples are often analyzed by reacting a reagent chemical with the tissue sample and then analyzing the resulting reactions for various identifying characteristics. For example, in some arrangements, a tissue sample is disposed on a glass slide, and a reagent chemical is supplied over the tissue sample and slide. In other arrangements, cover slipping is often used to protect the reagents from evaporation in tissue staining instruments. The cover slip can be in many different forms like a glass cover slip, an oil or liquid cover slip, or a gel cover slip which will form a layer on the reagent to avoid evaporation during long incubations or during high temperature treatment depending on the staining protocol.

SUMMARY

In one embodiment, an assembly for analyzing a sample on a substrate is disclosed. The assembly can include a body having a chamber formed therein. The assembly can also include a dispensing cavity to supply a reagent to the chamber. A substrate support structure can be configured to support the substrate such that a surface of the substrate to which the sample is to be coupled faces the chamber when the substrate is mounted to the substrate support structure. The chamber and the substrate support structure can be dimensioned such that, when the reagent is supplied to the dispensing cavity, the reagent is drawn into the chamber by way of capillary forces acting on the reagent.

In another embodiment, a method of analyzing a sample is disclosed. The method can include coupling the sample to a substrate. The method can include mounting the substrate to a substrate support structure over a chamber formed in the substrate support structure such that the sample faces the chamber. The method can include dispensing a reagent between a floor of the chamber and the substrate to react with the sample.

In yet another embodiment, an assembly for analyzing a sample on a substrate is disclosed. The assembly can include a body having a chamber formed therein. A dispensing cavity can supply a reagent to the chamber. A substrate support structure can be configured to support the substrate such that a surface or the substrate to which the sample is to be coupled faces the chamber when the substrate is mounted to the substrate support structure. A lifting mechanism can be configured to raise or lower the substrate relative to the chamber such that, when the substrate is raised relative to the chamber, the reagent flows into the chamber.

For purposes of summarizing the invention and the advantages achieved over the prior art, certain objects and advantages of the disclosure have been described herein above. Of course, it is to be understood that not necessarily all such objects or advantages may be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

BRIEF DESCRIPTION OF THE DRAWINGS

These aspects and others will be apparent from the following description of preferred embodiments and the accompanying drawings, which are meant to illustrate and not to limit the invention, wherein.

DETAILED DESCRIPTION

Various embodiments disclosed herein relate to a microchamber (such as a microchamber formed on or near a slide or other substrate) which does not use or require cover slipping, such as during long incubation or high temperature treatment of a tissue in immunohistochemistry. This microchamber can be used, for example, to stain a tissue without a glass, liquid or any other cover slip. In various embodiments a substrate, such as a microscope slide, with tissue mounted thereto can itself act as an evaporation protector and give reproducible staining of a tissue sample. For example, various embodiments include an inverted substrate mechanism for forming a microchamber in a system for analyzing a sample (e.g., a tissue sample) on a substrate (e.g., a glass slide). The disclosed embodiments can include a system for measuring various properties of a sample disposed in a microchamber.

In some embodiments, a sample, such as tissue or other type of biological material, may be positioned on a substrate. The substrate can be inverted relative to the chamber such that the tissue sample faces the chamber and the tissue sample is disposed between the slide and the microchamber. Thus, in some embodiments, the microchamber can be disposed between the substrate (e.g., a glass slide) and the slide holder (e.g., a bottom surface or floor of the microchamber). In some embodiments, the microchamber can be placed over a heater, such that a microchamber is formed between the substrate and the heater, and the sample is located inside the microchamber. In some embodiments, a portion of the substrate holder intervenes between the microchamber and the heater. One or more reagents may be dispensed into the microchamber, e.g., sequentially and/or simultaneously. Other treatment procedures (such as phototreatments or other types of treatments) may be used with the chamber disclosed herein. The reagent and the sample to be analyzed may be heated, for example using a thermal cycling heater, such as a thermoelectric cooler (TEC) heater. Various optical, chemical, or other analysis techniques may be used to analyze the sample before, during, and/or after heating.

Thus, in various embodiments disclosed herein, the disclosed microchamber can be used to stain or otherwise treat the tissue sample without using a glass slide, liquid cover slip, or any other type of cover slip. In the disclosed embodiments, the slide itself can act as an evaporation protector and can provide for the reproducible staining of tissue samples.

In some embodiments the capillary effect can be used to draw a reactant into the microchamber between a floor of the microchamber and the slide (which may be inverted relative to the microchamber). For example, the slide can form a top portion of the microchamber such that the surface to which the tissue sample is attached (and, indeed, the tissue itself) faces the microchamber and the floor thereof. Skilled artisans will understand that there may be different velocity profiles for a fluid flowing in a conduit, with the maximum velocity occurring at or near the center of the conduit. A nonslip boundary at the interface between the fluid and the conduit wall may create a resistance which opposes the fluid movement. Surface tension can have a significant effect on liquid flow in bounded spaces (such as a microconduit, or the space between a slide and a bottom surface of a microchamber) as additional pressure is typically applied to overcome the surface tension of the fluid, which becomes more dominant in the flow at micro scale.

Figure 1:
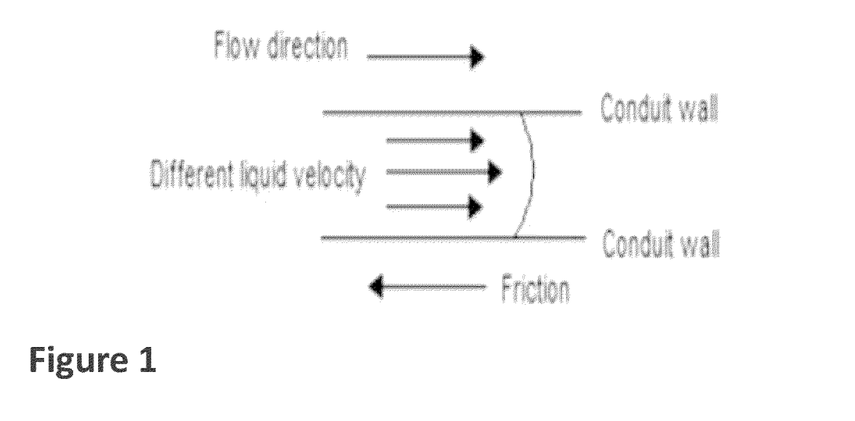
FIG. 1 is a schematic side cross-sectional view of a fluid flow along a nonslip boundary wall, which may be similar to fluid flow between the floor of the microchamber and the inverted slide.

Surface tension also gives rise to another phenomenon, called the capillary effect in which liquid adhesion to the conduit walls is sufficiently strong so as to draw liquid between the walls. FIG. 1 is a schematic side cross-sectional view of a fluid flow along a nonslip boundary wall, which may be similar to fluid flow between the floor of the microchamber and the inverted slide. Due to the capillary effect and density of the liquid the microchamber can cause or enable laminar flow of the liquid within the chamber, which can effectively distribute the reagent over the entire tissue surface area. Due to laminar flow the reagent spreading may be uniform and unidirectional because of the manner in which the reagent is dispensed into the microchamber.

Figure 2:
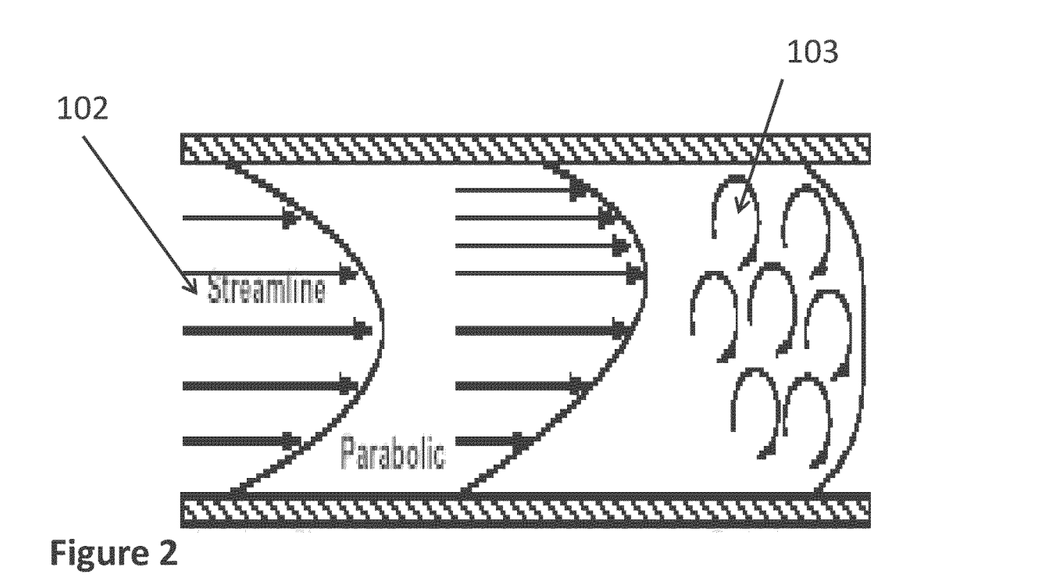
FIG. 2 is a schematic side cross-sectional view of fluid flow between two surfaces that compares laminar flow with turbulent flow.

FIG. 2 is a schematic side cross-sectional view of fluid flow between two surfaces that compares laminar flow 102 with turbulent flow 103. Laminar flow 102 occurs when using smooth surfaces (e.g., between tissue on a glass slide on the top and a machined or etched microchamber floor on the bottom) and at relatively low flow rates (microreagents which may be less than 100 µl in volume). The flow in the microchamber between the floor and the substrate (e.g., a glass slide) may be streamlined and there may be little or no turbulence 103. The flow may occur in parallel layers, with minimal disruption between these layers. The flow velocity may be greatest at the center and diminish towards the periphery or boundary. This can cause the laminar flow 102 to define a bullet shaped velocity profile. Due to the laminar flow 102 of reagent in the microchamber, the staining may yield more precise, repeatable, and reproducible results.

Figure 3:
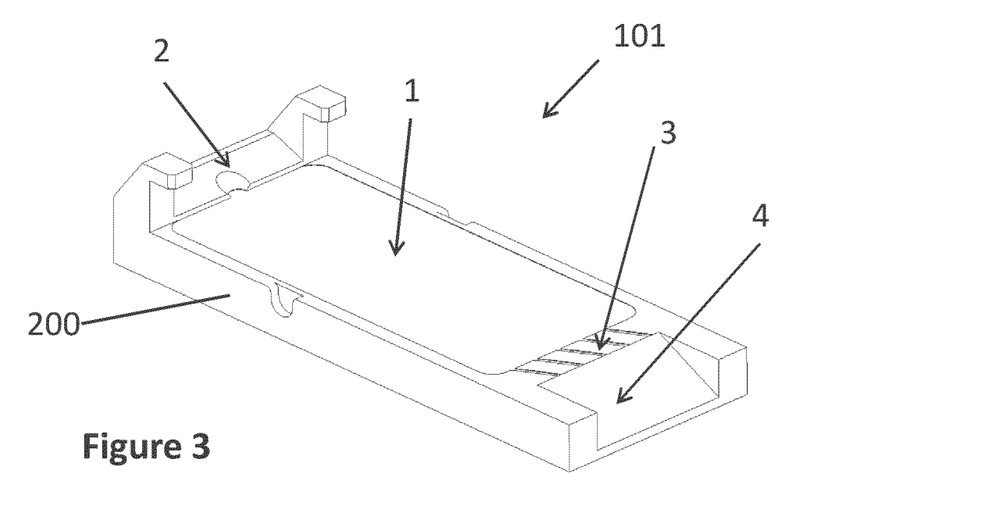
FIG. 3 is a schematic perspective view of an assembly for forming a microchamber for an inverted substrate or slide.

FIG. 3 is a schematic perspective view of an assembly 101 for forming a microchamber 1 for an inverted substrate or slide. The slide or substrate are not illustrated in FIG. 3 for ease of illustration. The microchamber 1 can be formed in a body 200 and can have a floor at the bottom surface of the microchamber and a plurality of walls extending upwardly from the floor. The microchamber 1 can be covered by the substrate or slide (not shown in FIG. 3). The microchamber 1 can be constructed in such a way that it can use less than about 100 µl so that it can perform any type of histology processes on slides, such as immunohistochemistry (IHC), in situ hybridization (ISH), chromogenic in situ hybridization (CISH), fluorescent in situ hybridization (FISH), etc. Dimensionally, the microchamber 1 can be constructed with dimensions of about 25 mm×60 mm, which can hold or contain about 80 µl. In some embodiments, the microchamber 1 can be dimensioned to hold a volume of reactant in a range of about 60 µl to about 95 µl. Skilled artisans will appreciate that the dimensions and volume can be less than or greater than these dimensions, however. In some embodiments, the thickness or depth of the microchamber 1 can be in a range of about 40 microns to about 85 microns, for example about 70 microns in one embodiment. In some embodiments, the thickness or depth of the microchamber 1 can be in a range of about 40 microns to about 150 microns. The microchamber 1 can be fabricated from any suitable material, including, e.g., aluminium and/or stainless steel (medical grade) with a non-contamination coating layer.

In FIG. 3, the chamber 1 has a width of about 25 mm and a length of about 60 mm, which can accommodate reagent chemicals in a range of about 15 µl to about 200 µl, in a range of about 60 to about 95 µl, in a range of about 70 µl to about 90 µl, in a range of about 75 µl to about 85 µl, e.g. less than or equal to about 80 µl of microreagent in each embodiment disclosed herein. Dimensionally, the width, length and the chamber thickness or depth can be increased and/or decreased to accommodate any suitable volume of reagent.

The microchamber 1 can have a non-contamination protection layer, which can be less than about 10 microns thick, or in a range of about 1 micron to about 10 microns, comprising a chemically and thermally resistive material. The non-contamination protection layer can provide a longer lifetime for the microchamber and can avoid inaccurate results due to cross contamination of reagents or tissues. This non-contamination layer can prevent the reagents from cross-contaminating due to non-stick properties.

As shown in FIG. 3, the assembly 101 can comprise an evacuation gateway 4 which can evacuate unwanted materials, wash solution, and other residual liquids, which may obstruct the laminar flow of reagent in the chamber. The assembly 101 can also comprise a bubble gate 3. The bubble gate 3 can evacuate the bubbles created due to dispensing the reagent. For example, the bubble gate 3 can allow bubbles to exit the apparatus 101 through the evacuation gateway 4. The assembly 101 and microchamber 1 can be constructed in such a way that when reagent is dispensed into a reagent dispensing cavity 2 (which may comprise a port or opening), the reagent can flow in a laminar profile across the microchamber 1 instead of in a turbulent profile, which may otherwise create bubbles and/or unwanted formations or noise that causes uneven spreading of the reagent.

Figure 4:
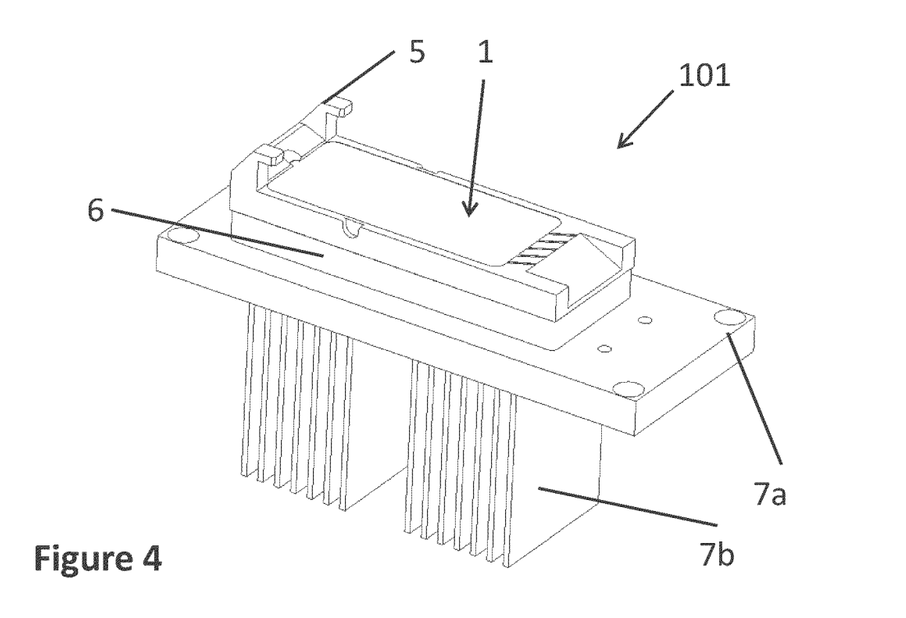
FIG. 4 is a schematic perspective view of the assembly including a heating mechanism.

FIG. 4 is a schematic perspective view of the assembly 101 including a heating mechanism. In some embodiments, the assembly 101 includes a cooling mechanism, which may be the same as or different from the heating mechanism. The temperature of the microchamber 1 can be controlled with independent heating and cooling with the heating mechanism. The heating mechanism can include a thermal cycling module 6 configured to controllably heat and/or cool the microchamber 1. The heating mechanism can further include a base 7a and heat sink (which can include heat sink fins 7b) for conducting heat away from the assembly 101. As shown in FIG. 4, the heating mechanism can be mounted to a back surface of the body 200, e.g., opposite the opening defined by the microchamber 1.

Figure 5:
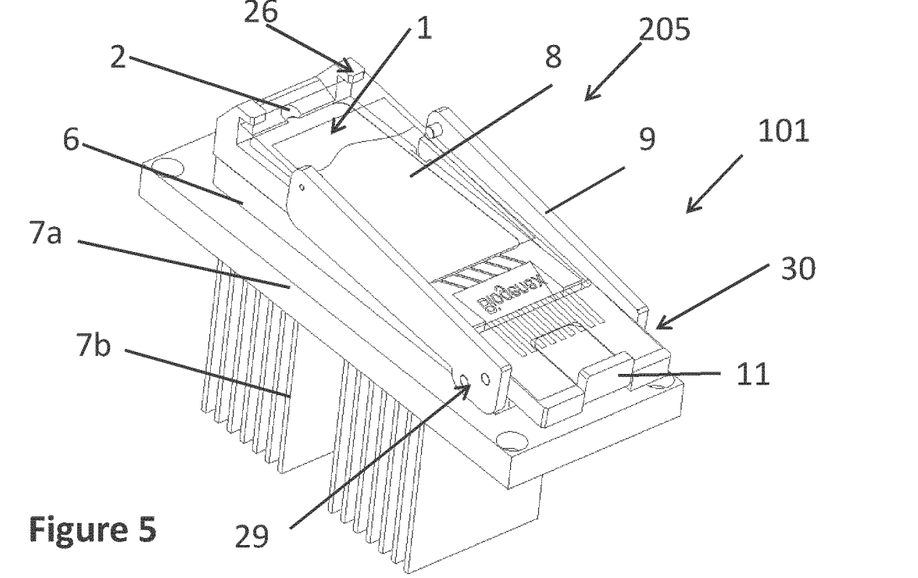
FIG. 5 is a schematic perspective view of the assembly including a glass slide mounted over the microchamber in an inverted orientation.
Figure 6:
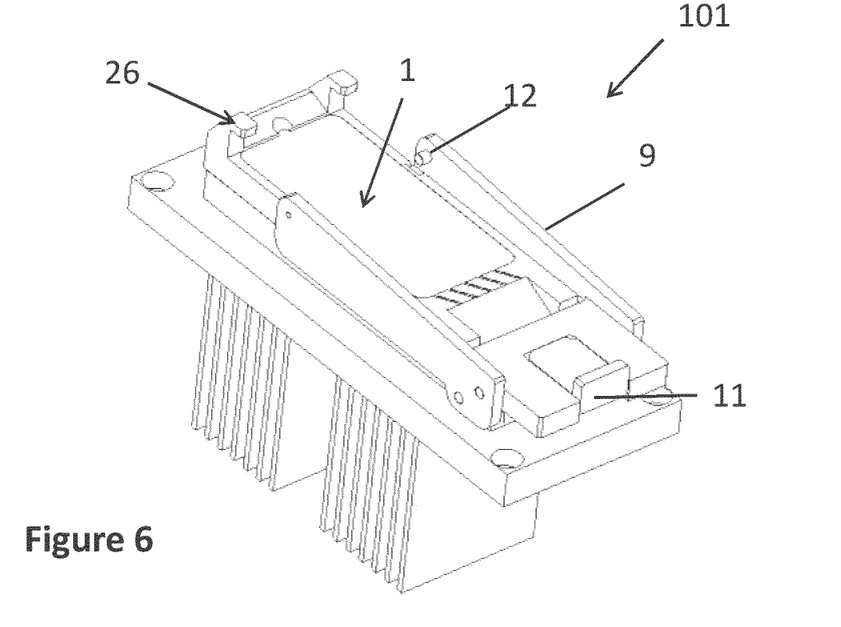
FIG. 6 is a schematic perspective view of the assembly without the slide.

FIG. 5 is a schematic perspective view of the assembly 101 including a substrate, here a glass slide 8 mounted over the microchamber 1 in an inverted orientation. For example, in FIG. 5, the tissue sample or other item to be analyzed can be coupled with or applied on the surface of the slide 8 that faces the microchamber 1, such that the tissue sample is disposed between the slide 8 or substrate and the microchamber 1. The assembly 101 can include a substrate support structure 205 configured to support the slide such that the tissue sample faces the microchamber 1 when the slide 8 is mounted to the substrate support structure 205. The chamber 1 and the substrate support structure 205 can be dimensioned such that, when the reagent is supplied to the dispensing cavity 2, the reagent is drawn to the chamber 1 by way of capillary forces acting on the reagent. FIG. 6 is a schematic perspective view of the assembly 101 without the slide 8. The slide 8 can include a tissue sample on a sick of the slick 8 that is to face the microchamber 1. For example, the slide 8 can be placed over the microchamber 1 such that the tissue sample faces the floor or bottom of the microchamber 1. A slide holding lever 9 can be used to guide the slide 8 over the microchamber 1. As explained herein, the slide 8 can be placed in an inverted position to process the sample when the reactant enters the microchamber 1. During staining or other processing, the tissue can face the micro chamber 1 as shown in FIG. 5. To prevent the disengagement of the slide 8, the slide 8 can be locked with a slide clip 11 and with a slide guide stopper 5. As shown in FIG. 6, for example, a support tab 12 can support the end of the slide 8 near the slide guide stopper 5. The slide clip 11 can enable the user to load the slide 8 and hold the slide 8 in position. The stopper 5 can prevent the slide 8 from lifting away from the body 200 more than the desired height during the removal of residuals. The support tab 12 can bear against the slide 8 with an opposing force directed towards the microchamber 1 to ensure that the slide 8 is rested on the body 200 over the microchamber 1 without any airgaps. Furthermore, one or more hooks or projections 26 can be provided on an end portion of the substrate support structure 205 to help secure the slide 8 to the substrate support structure 205. In some embodiments, an adhesive can be used to adhere the slide 8 or substrate to the top surface of the body 200, e.g., around the upper edges of the chamber 1.

As shown in FIG. 5, the substrate support structure 205 can include a sliding mechanism 30 configured to slidably engage with the body 200. For example, a user can insert a slide 8 into the sliding mechanism 30 and can slide or translate the sliding mechanism towards the dispensing cavity 2 to position the slide 8 or other substrate over the chamber 1. In some embodiments, the substrate support structure 205 can also comprise a pivoting mechanism 29 configured to pivot or rotate relative to the body 200 and chamber 1. For example, in some arrangements, the pivoting mechanism 29 can be used to position the slide 8 over the chamber 1. In some arrangements, the pivoting mechanism 29 can be used to lift the slide 8 relative to the chamber 1 such that reagent can more easily and/or uniformly spread over the chamber 1.

When the slide 8 is placed over the chamber 1, the slide 8 and the floor of the microchamber 1 can create a capillary channel that causes a reagent to flow into the microchamber by way of capillary forces, which may cause a volume of flow on the order of microlitres. As explained herein, the floor of the microchamber 1 can comprise the bottom surface of the chamber 1 and can comprise a micromachined, etched, or other surface. In some embodiments, the floor or bottom surface of the chamber 1 can comprise a transparent material, while in other embodiments, the floor or bottom surface of the chamber 1 can comprise an opaque or translucent material. The floor or bottom surface of the microchamber 1 can be part of the assembly 101 and not a separate coverslip. When a liquid reagent passes through the reagent dispensing cavity 2, the reagent can flow in a laminar profile, and the reagent can be spread over the tissue in a uniform manner. In addition, any air bubbles can be evacuated through the bubble gate 3 shown in FIG. 3.

Figure 7:
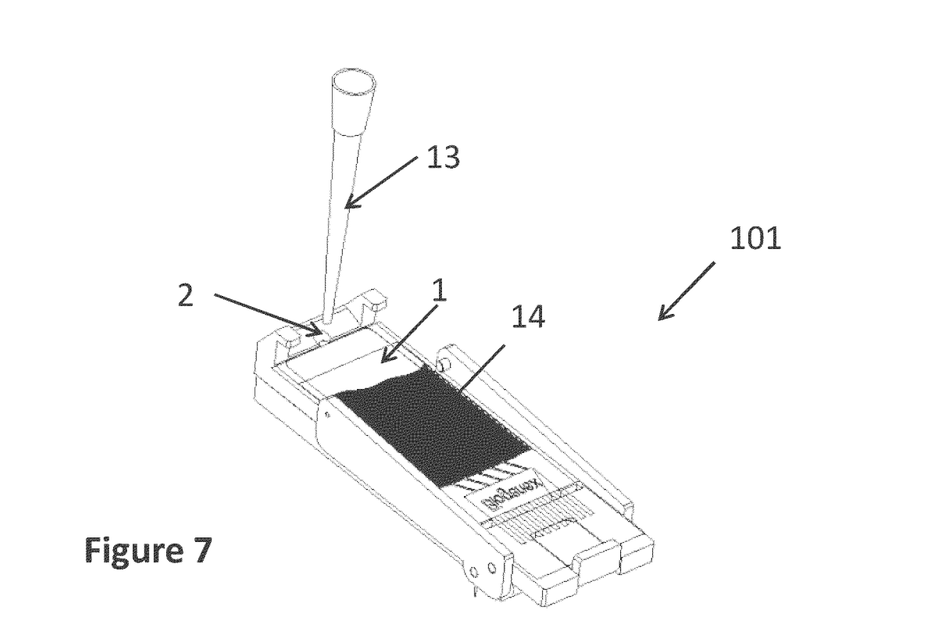
FIG. 7 is a schematic perspective view of the assembly in which a reagent supply device is used to dispense a reagent into the reagent dispensing cavity.
Figure 8:
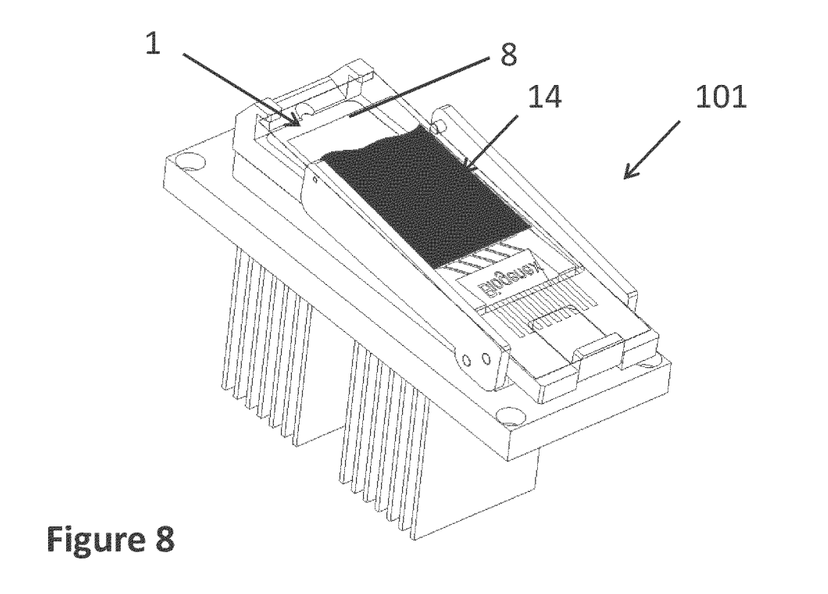
FIG. 8 is a schematic perspective view of the assembly showing the reagent spreading between the slide and the floor of the microchamber by way of capillary action.

FIG. 7 is a schematic perspective view of the assembly 101 in which a reagent supply device 13 is used to dispense a reagent 14 into the reagent dispensing cavity 2. FIG. 8 is a schematic perspective view of the assembly 101 showing the reagent 14 spreading between the slide 8 and the floor of the microchamber 1 by way of capillary action. As shown in FIG. 7, a user can insert the distal end of the device 13 into an opening of the cavity 2 and can dispense the reagent 14 into the cavity 2. The reagent 14 can be pulled into the microchamber 1 by way of capillary action. Once the reagent 14 is dispensed, the tissue on the slide 8 can be immersed directly into the reagent 14 with the desired temperature for reaction. This may improve the speed of reaction as the heat treatment during the reaction is directly applied on the tissue and the reagent.

Using the disclosed microchamber 1 can advantageously be used to speed up reactions in all directions, e.g., by heating the microchamber 1, etc. In some tissue staining procedures, for example, the glass slide 8 with tissue can be placed on the heating assembly to incubate and can be treated with temperature per the desired protocol. In these other types of processes, heat can be first transferred to the glass slide in order to reach the tissue sample and reagent. Advantageously, in the disclosed embodiments, the micro reagent 14 can be heated and the heat subsequently transferred to the tissue, which may improve efficiency of the chemical reaction. The disclosed assembly 101 and microchamber 1 can also prevent or reduce the evaporation of reagents.

Figure 9:
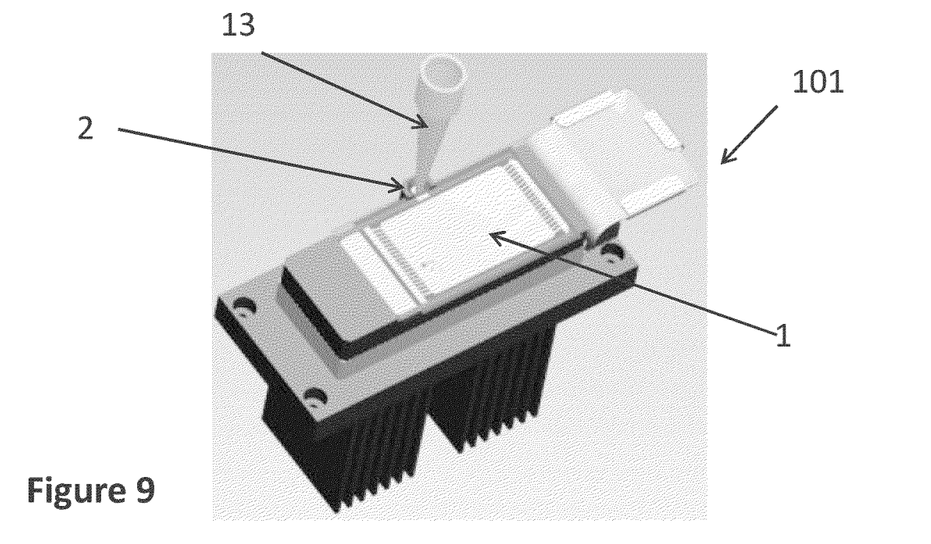
FIG. 9 is a schematic perspective view showing the dispensing cavity positioned along a side end of the assembly.

The volume of the microchamber 1 and the dispensing patterns can be changed according to the desired use. For example, reagent can be dispensed through the dispensing cavity 2 at a top end of the assembly 101 along a narrow dimension of the assembly 101 as shown in FIGS. 2-8. In other embodiments, the dispensing cavity 2 can be positioned near the center of a side end of the assembly. For example, as shown in FIG. 9, the dispensing cavity 2 can be positioned along the side end of the assembly 101 that extends along a longitudinal direction, e.g., a wider dimension of the assembly 101.

The microchamber 1 and assembly 101 can be configured such that the assembly 101 is sufficiently flexible to accommodate various desired volumes and clones performed on the slides. Tissues can be processed with a very small volume of reagents (on the order of micro liters). The microchamber 1 can be replaced with a modular construction which has thermal cycling mechanism 6 and other mechanisms, such as the slide guide stopper 5, etc. FIGS. 10-14 are schematic perspective views of the assembly 101 which can be fabricated in a modular manner to have a variety of microchamber 1 sizes and dispensing characteristics.

Figure 10:
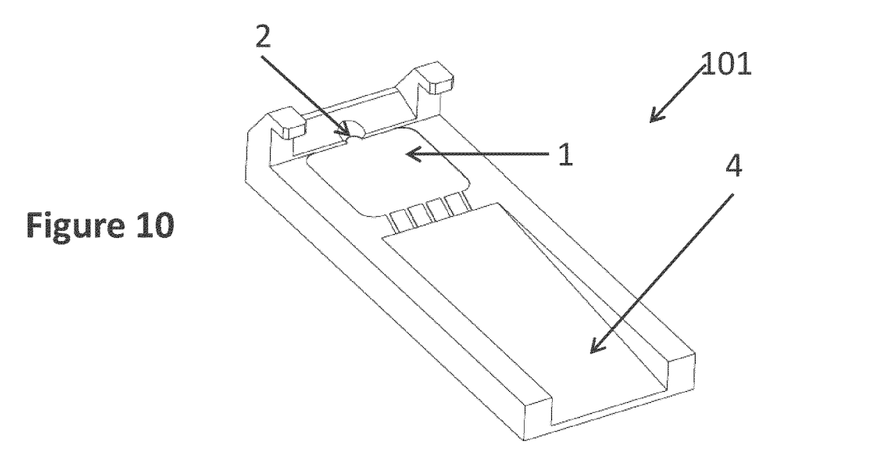
FIGS. 10-14 are schematic perspective views of various embodiments of the assembly which can be fabricated in a modular manner to have a variety of microchamber sizes and dispensing characteristics.

For example, as shown in FIGS. 10-14, various sizes of microchambers 1 can be used according to the user's desired parameters. For example, the microchamber 1 of FIG. 10 is smaller than the microchamber shown in FIGS. 13-14. The evacuation gateway 4 can also have different sizes, e.g., larger in FIG. 10 and smaller in FIG. 14. The microchamber 1 structure can be a modular component that may be a replaceable part of the assembly 101. For example, the user can replace the microchamber 1 with different patterns and/or sizes without the help of any tools. Thus, the modularity of the assembly 101 can enable the user to create any suitable microchamber 1 and dispensing pattern.

Figure 11:
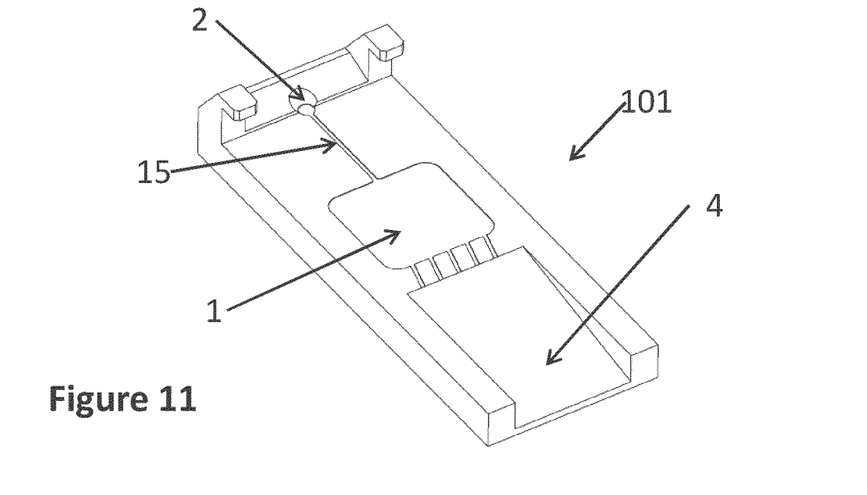
Figure 12:
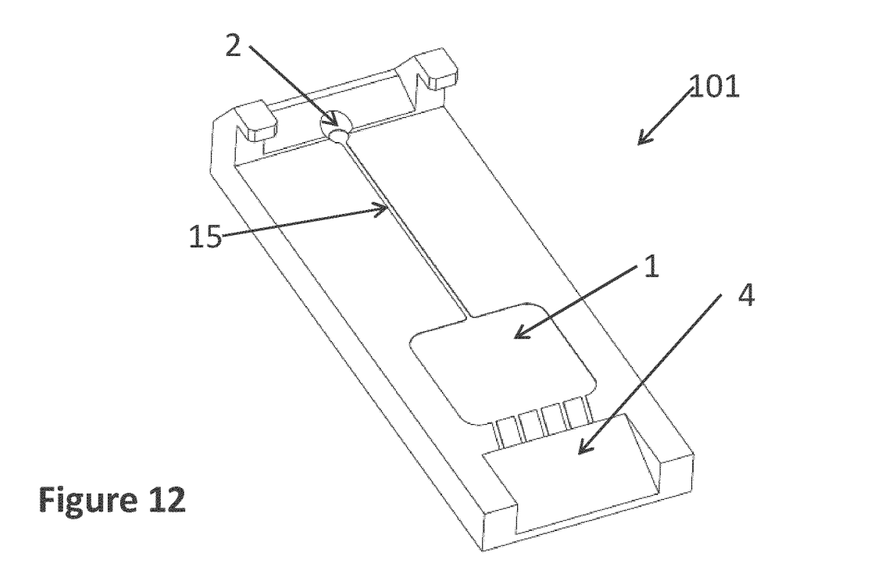
Figure 13:
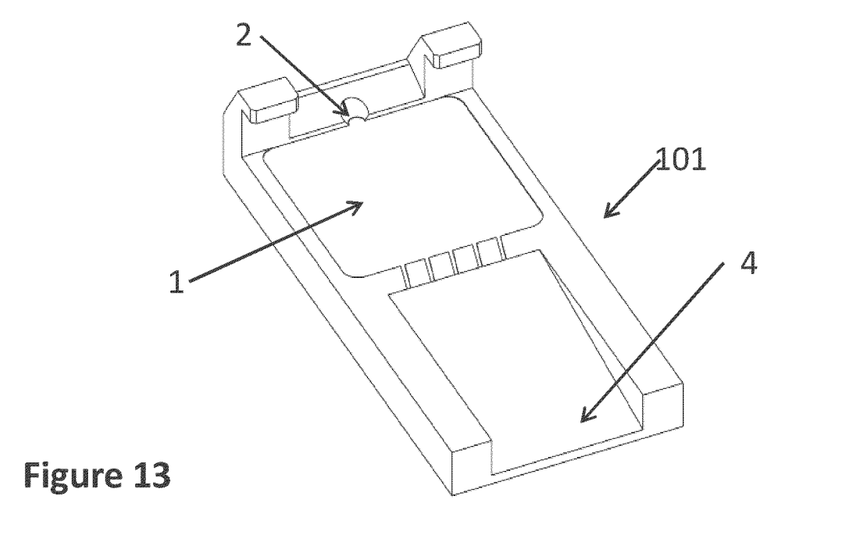
Figure 14:
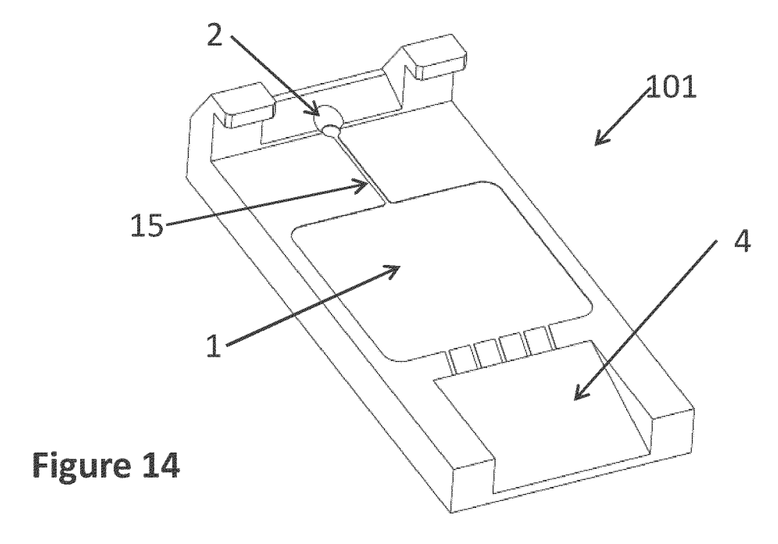

Further, as shown in FIGS. 11-12 and 14, the assembly 101 can include a dispensing channel 15 that fluidly connects the dispensing cavity 2 and the microchamber 1. The reagent can be dispensed into the dispensing cavity 2. As explained above, capillary forces can pull the reagent from the dispensing cavity 2 through the dispensing channel 15 and into the microchamber 1. As shown in FIGS. 11-12 and 14, the dispensing channel 15 can have various lengths to accommodate the corresponding sizes of the microchamber 1 and/or the evacuation gateway 4.

Figure 15:
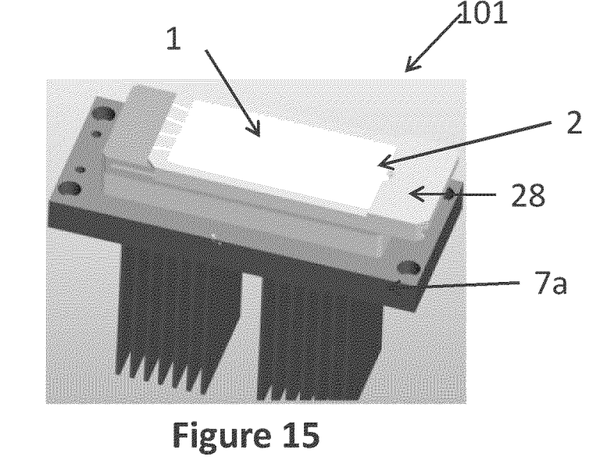
FIG. 15 illustrates the assembly with a detachable top assembly that can be attached and detached from the base of the heating assembly.

The modularity of the assembly 101 can be further enhanced by the use of a detachable top assembly. For example, FIG. 15 illustrates the assembly 101 with a detachable top assembly 28 that can be attached and detached from the base 7a of the heating assembly. The detachable assembly 28 can include the microchamber 1 and the dispensing cavity 2. In some embodiments, the detachable assembly 28 can include the thermal cycling mechanism 6 or other components. Advantageously, the detachable assembly 28 can be removed from the base 7a of the heating assembly and replaced with a different module if desired by the user.

Figure 16:
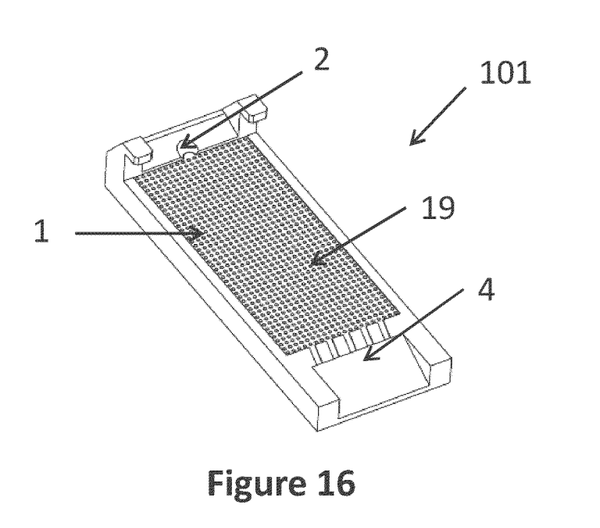
FIG. 16 is a schematic perspective view of an embodiment of the assembly in which the microchamber is formed using an etching process.

The microchamber 1 can be formed using any suitable technique, which may depend at least in part on the usage of the assembly 101. Furthermore, the assembly 101 (e.g., including the body 200 with chamber 101) can be formed of any suitable material. For example, the body 200 can be formed of a metal in some embodiments. In other embodiments, the body 200 can be formed of a ceramic or any other suitable thermally conductive and/or chemically resistant materials (which may be medical grade). FIG. 16 is a schematic perspective view of the assembly 101 in which the microchamber 1 is formed using an etching process. In some embodiments, the assembly 101 can be etched using any suitable type of etching process, such as wet etching, dry etching, etc. The etching process can define an etched floor 19 of the microchamber 1.

Figure 17:
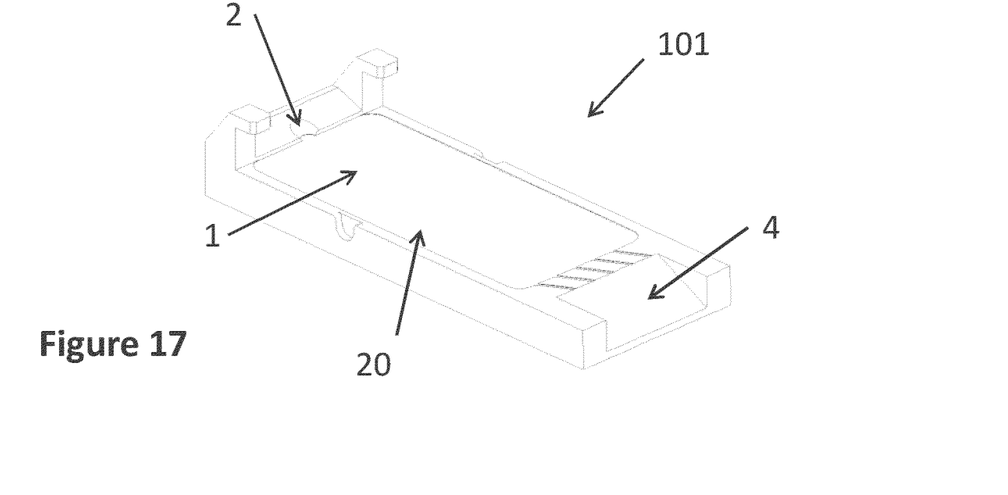
FIG. 17 is a schematic perspective view of an embodiment of the assembly in which the microchamber is formed using a micromachining process.

FIG. 17 is a schematic perspective view of the assembly 101 in which the microchamber 1 is formed using a micromachining process. In various embodiments, the assembly 101 can be machined using any suitable tool, as a milling tool, drill, etc. The machining process can define a micromachined floor 20 of the microchamber 1. Although the embodiments of FIGS. 16-17 described etching and machining processes, still other processes, such as laser cutting, may be used to define the microchamber 1.

Figure 18:
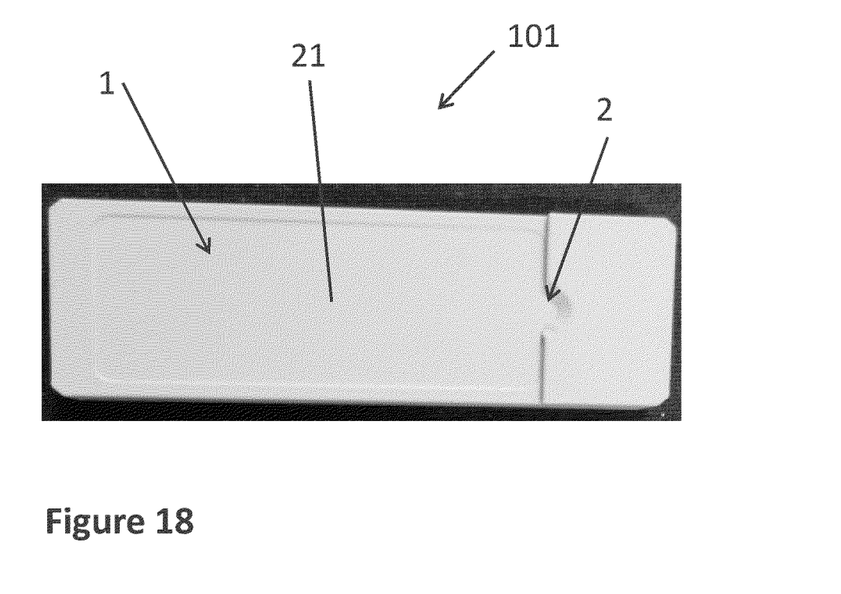
FIG. 18 is an image of an embodiment of the assembly that includes a non-stick coating applied at least over the floor of the microchamber.

In some embodiments, the microchamber 1 can be coated with a non-stick coating 21. FIG. 18 is an image of the assembly 101 that includes the non-stick coating 21 applied at least over the floor of the microchamber 1. In some embodiments, the non-stick coating 21 can be applied over the dispensing cavity 2 and any other suitable surfaces of the assembly 101. The non-stick coating 21 can be a hydrophobic coating for avoiding sticking of the reagent to the assembly 101 and for reducing contamination. The coating 21 can be made according to the reagents and chemical used in a particular process. For example, the coating 21 can comprise micro-layered Teflon®, ceramic, ultratech hydrophobic coating, saphron coating etc.

These coating 21 can be adapted to achieve a non-contamination, hydrophobic, non-stick microchamber 1 without influencing the functionality of the microchamber 1. The coating 21 as shown in FIG. 18 can have a thickness of less than about 10 microns. In some embodiments, the coating 21 can have a thickness in a range of about 2 microns to about 10 microns. According to the thickness of the coating 21 used, the microchamber 1 can be designed so that the desired volume of reagent is used and maintained for performing the reaction. This can be achieved with various materials and techniques, including the materials described herein.

The aspiration and dispensing of reagent can be automated for the microchamber 1 with a robotic structure. Proper liquid level sensors can be provided, which can avoid cross contamination and waste of liquid due to unwanted dipping from the pipette tip or probe.

Figure 19:
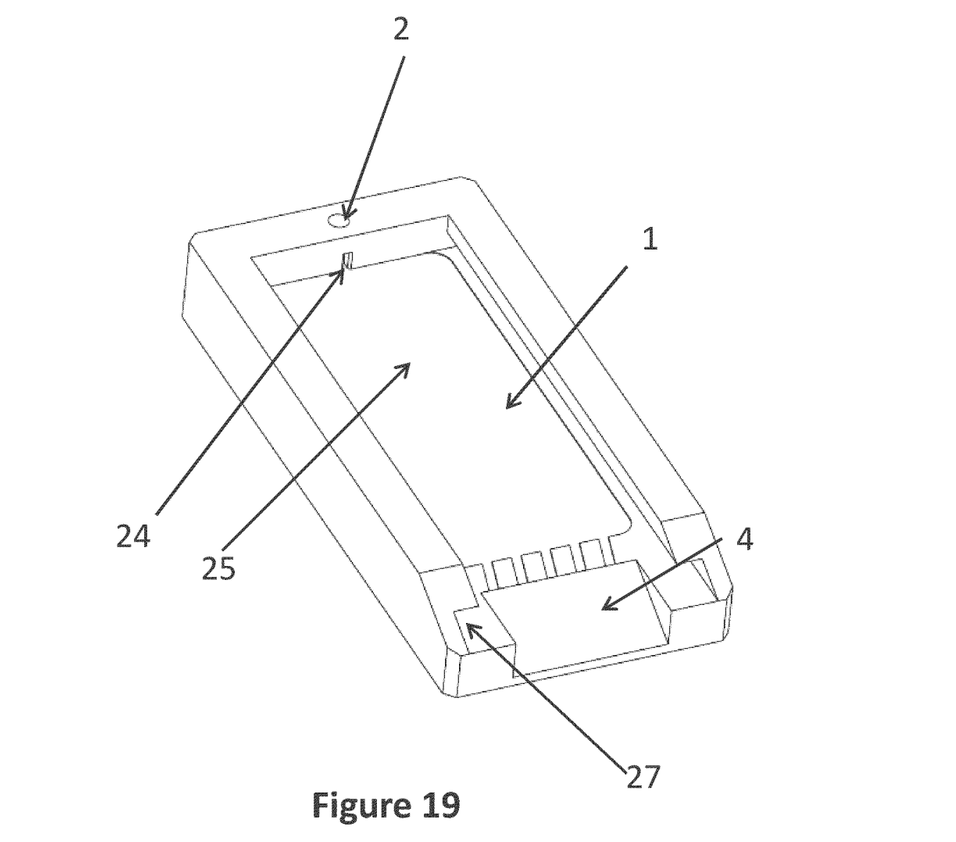
FIG. 19 is a schematic perspective view of the assembly, according to various embodiments.

FIG. 19 is a schematic perspective view of the assembly 101, according to various embodiments. Various techniques can be used to apply reagents and/or to wash and blow the slide 8. For example, a slide 8 can be clamped over the microchamber 1 with a slide guide, and a robot can push, pull, hold, and/or lift the slide 8. In some embodiments, the slide 8 can be lifted with pressure 25. The microreagent can spread into the chamber 1 by capillary action through a vent 24 or bored cavity which can guide the micro reagent to flow into the microchamber 1. The assembly 101 shown in FIG. 19 can also include a slot 27 which can receive the slide 8 or other substrate in slidable engagement. Apart from the microreagent the slide 8 can be washed and blown to remove the reacted reagent and to apply the new reagent as per the desired protocol. For operations, the slide 8 can be lifted with a certain pressure 25 of air or liquid which can lift the slide 8.

Dispensing of the reagent can vary depending on the viscosity of the liquid. Depending on the density of the reagent, the laminar flow of the liquid can vary. To ensure that the liquid is spread over all the tissue in the microchamber 1 the dispensing pressure can be adjusted accordingly.

In some embodiments, as explained above, reagent can be spread uniformly through or over the chamber 1 by way of capillary action. In some embodiments, reagent can be spread through the chamber 1 by lifting the slide to enable the reagent or other liquid to flow into the chamber 1. For example, reagent can be introduced into the dispensing cavity 2, and the slide 8 can be temporarily lifted by a small amount. The reagent or other liquid can flow in the space between the floor of the chamber 1 and the lifted slide 8. Once the reagent is uniformly spread in the chamber 1, the slide 8 can be lowered over the chamber 1 and reagent.

The slide 8 or other substrate can be lifted in any suitable manner. For example, in some embodiments, a pressure source can be used to raise the slide 8. Air or other fluid can be introduced into the microchamber 1, and the pressure can cause the slide 8 to raise by a suitable amount. In other embodiments, a mechanical or electromechanical mechanism (such as a pivoting mechanism 29) can be used to mechanically lift the slide 8 or substrate. In some embodiments, a piezoelectric actuator can be used to lift the slide 8. In still other embodiments, a non-reactive liquid (which may be hydrophobic) can be supplied to the microchamber 1. The non-reactive liquid can be configured such that it does not react with the reagent. When introduced into the chamber 1, the non-reactive liquid can cause the slide 8 to raise by a sufficient amount. The reagent can be dispensed into the chamber 1 between the floor of the chamber 1 and the lifted slide 8. In some embodiments, the reagent can drive the non-reactive liquid from the chamber 1 and the apparatus 101. In some embodiments, a vacuum source can be applied to the chamber 1 to suck the non-reactive liquid from the chamber 1.

Thus, in some embodiments, the slide 8 or other type of substrate can be lifted to enable the reactant or reagent to spread uniformly in the chamber 1 between the floor and the lifted slide 8. In some arrangements, the slide 8 can be lifted by a height in a range of about 0.5 mm to about 1 mm.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An assembly for analyzing a sample on a substrate, the assembly comprising:
    a body having a chamber including a chamber floor formed therein;
    a fluid dispensing cavity formed in the body;
    the fluid dispensing cavity configured to fluidly supply a reagent to the chamber; a substrate support structure adapted to mount a substrate in an elevated position over the chamber floor such that a lower surface of the substrate to which the sample is to be coupled faces the floor of the chamber, when the substrate is mounted to the substrate support structure, wherein the substrate being mounted to the substrate support structure forms at least a top portion of the chamber for enabling the reagent to process the sample in the chamber;
    a slide holding lever having two laterally mounted support tabs disposed at a first end configured to abut a top surface of the substrate with fain two opposing forces directed towards the chamber floor by the two support tabs and a second end of the slide holding lever having a pivot mechanism; the first end being opposed to the second end and the pivot mechanism being configured to rotate the support tabs towards the chamber floor; wherein the pivot mechanism is attached to the substrate support structure;
    a sliding mechanism configured to slidably engage with the substrate support structure such that the substrate can slide towards the fluid dispensing cavity to position the substrate over the chamber floor and to position the substrate underneath the two laterally mounted support tabs of the slide holding lever; and
    wherein the chamber and the substrate support structure are adapted to provide a laminar flow of the reagent such that, when the reagent is supplied to the dispensing cavity, the reagent is drawn into the chamber by way of capillary forces acting on the reagent.

2. The assembly of claim 1, wherein the substrate comprises a glass slide, the assembly further comprising the slide, the sample facing the chamber when the sample is mounted to the slide.

3. The assembly of claim 1, wherein a depth of the chamber is in a range of about 40 microns to about 85 microns.

4. The assembly of claim 1, wherein the chamber is sized to hold about 15 µl to about 200 µl of reagent.

5. The assembly of claim 4, wherein the chamber is sized to hold less than or equal to about 80 µl of reagent.

6. The assembly of claim 1, wherein the assembly comprises a length along a longitudinal direction and a width along a lateral direction, the length larger than the width, wherein the dispensing cavity comprises a port formed along a first end portion extending along the lateral direction.

7. The assembly of claim 6, further comprising an evacuation gateway in the body along a second end portion opposite the second end portion, the evacuation gateway configured to evacuate unwanted materials, wash solution, or residual liquids.

8. The assembly of claim 7, further comprising a bubble gate in the body between the chamber and the evacuation gateway, the bubble gate configured to evacuate bubbles.

9. The assembly of claim 1, wherein the assembly comprises a length along a longitudinal direction and a width along a lateral direction, the length larger than the width, wherein the dispensing cavity comprises a port formed along an end portion extending along the longitudinal direction.

10. The assembly of claim 1, further comprising a heating mechanism mounted to a back surface of the body disposed opposing the substrate.

11. The assembly of claim 10, wherein the heating mechanism comprises a thermal cycling module configured to heat the body and a heat sink.

12. The assembly of claim 1, wherein the substrate support structure comprises a clip and a guide stopper to prevent disengagement of the substrate.

13. The assembly of claim 1, wherein the substrate support structure comprises one or more hooks or projections to secure the substrate to the body.

14. The assembly of claim 1, further comprising a dispensing channel extending between the dispensing cavity and the chamber to convey the reagent from the dispensing cavity to the chamber.

15. The assembly of claim 1, further comprising a protective coating over at least the floor of the chamber.

16. The assembly of claim 1, wherein the assembly comprises a plurality of modular components combined to form the assembly.

17. The assembly of claim 1, wherein the chamber comprises an etched floor.

18. The assembly of claim 1, wherein the chamber comprises a micromachined floor.

19. A method of analyzing a sample, the method comprising:
coupling the sample to a substrate;
mounting the substrate to a substrate support structure in an elevated position over a chamber floor being part of a chamber formed in the substrate support structure such that the sample faces the chamber floor and the substrate forms at least a top portion of the chamber;
sliding the substrate along a portion of the substrate support structure longitudinally towards a fluid dispensing cavity to position the substrate over the chamber floor to enclose the sample in the chamber;
providing two opposing forces to the substrate with two laterally disposed support tabs across a width of the substrate to position the substrate underneath the two laterally mounted support tabs, wherein the opposing forces are directed towards the chamber floor; and
dispensing a reagent between the chamber floor and the substrate in the chamber so as to react with the sample by way of laminar flow of the reagent.

20. The method of claim 19, wherein dispensing the reagent comprises using capillary forces to cause the reagent to flow between the chamber floor and the substrate.

21. The method of claim 19, wherein using capillary forces comprises dispensing the reagent into a dispensing cavity, the dispensing cavity in fluid communication with the chamber.

22. The method of claim 19, wherein using capillary forces comprises spacing the substrate relative to the chamber such that the reagent flows to the chamber by capillary action.

23. The method of claim 19, further comprising heating the substrate support structure to heat the reagent.

24. The method of claim 19, wherein the chamber is sized to hold about 15 µl to about 200 µl of reagent.

25. The method of claim 24, wherein the chamber is sized to hold less than or equal to about 80 µl of reagent.

26. The method of claim 19, further comprising rotating a portion of the substrate support structure to position the substrate over the chamber.

27. The method of claim 19, wherein dispensing the reagent comprises raising the substrate relative to the chamber to enable the reagent to flow into the chamber.

28. The method of claim 27, wherein raising the substrate comprises engaging a pressure source to pressurize the chamber to raise or lower the substrate.

29. The method of claim 27, wherein raising the substrate comprises engaging a mechanical device or an electromechanical device to raise or lower the substrate.

30. The method of claim 29, wherein raising the substrate comprises engaging a pivoting mechanism.

31. The method of claim 27, wherein raising the substrate comprises injecting a non-reactive liquid into the chamber to raise the substrate.

32. The method of claim 27, comprising raising the substrate relative to the chamber by a height in a range of about 0.5 mm to about 1 mm.

33. An assembly for analyzing a sample on a substrate, the assembly comprising:
a body having a chamber including a floor formed therein;
a dispensing cavity being formed in the body to supply a reagent to the chamber;
a substrate support structure adapted to mount the substrate in an elevated position over the chamber floor such that a lower surface of the substrate to which the sample is to be coupled faces the chamber when the substrate is mounted to the substrate support structure;
wherein the substrate forms at least a top portion of the chamber for enabling the reagent to process the sample over the chamber floor;
a sliding mechanism with a slide clip configured to slidably engage with the substrate support structure such that the substrate can slide longitudinally towards the fluid dispensing cavity to position the substrate over the chamber floor; and
a lifting mechanism configured to raise or lower the substrate relative to the chamber floor such that, when the substrate is raised relative to the chamber floor, the reagent flows into the chamber.

34. The assembly of claim 33, wherein the lifting mechanism is configured to raise the substrate from a first position to a second position, wherein the substrate in the first position is at rest over the chamber, and wherein the substrate in the second position is raised to enable the reagent to flow into the chamber.

35. The assembly of claim 33, wherein the lifting mechanism comprises a mechanical or an electromechanical device.

36. The assembly of claim 35, wherein the lifting mechanism comprises a pivoting mechanism configured to pivot the substrate relative to the chamber.

37. The assembly of claim 33, wherein the lifting mechanism comprises a pressure source configured to pressurize the chamber to raise or lower the substrate.

38. The assembly of claim 33, wherein the lifting mechanism comprises a fluid source to supply a non-reactive liquid to the chamber.

39. The assembly of claim 33, wherein a depth of the chamber is in a range of about 40 microns to about 150 microns.

40. The assembly of claim 33, wherein the chamber is sized to hold about 15 µl to about 200 µl of reagent.

41. The assembly of claim 40, wherein the chamber is sized to hold less than or equal to about 80 µl of reagent.

42. The assembly of claim 33, wherein the lifting mechanism is configured to raise the substrate by a height in a range of about 0.5 mm to about 1 mm.

\* \* \* \* \*